Figure 1:
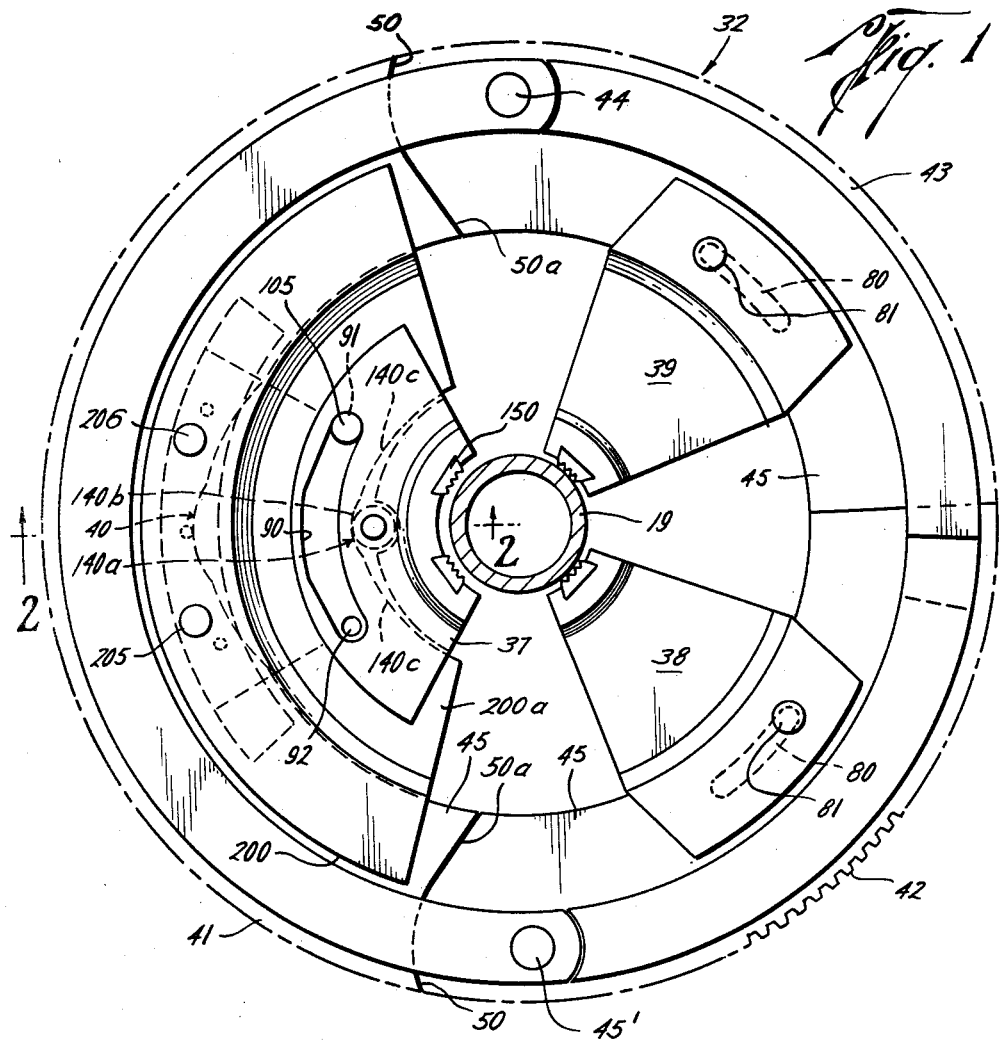

Albert L. George
INVENTOR.

BY Hayden & Pravel

ATTORNEYS

United States Patent Office 3,140,624
Patented July 14, 1964

3,140,624
ARRANGEMENT FOR INCREASING THE GRIPPING ACTION IN A PIPE TONG IN RELATION TO PIPE DIAMETER
Albert L. George, Lafayette, La., assignor to Lamb Rental Tools, Inc., a corporation of Louisiana
Filed Mar. 5, 1962, Ser. No. 177,556
4 Claims. (Cl. 81—57)

The present invention relates to an improvement in a tong which is used for gripping tubular members and imparting rotary motion thereto, and more particularly, to an improvement which enables the same tong to be effectively used over a wider range of pipe diameters and which enables a greater gripping force to be exerted by the jaw segments of the tong when it is used on smaller diameter pipes within the pipe size range to thereby inhibit slipping or disengagement of the jaw segments.

In power tongs used to impart a rotary motion or torque to a tubular member so as to threadedly connect the tubular member to another member or to disconnect sections of tubular members, jaw segments are provided which are adapted to engage or grip the tubular member to transmit the rotary motion from the tong to the tubular member.

In U.S. Letters Patent No. 3,023,651, issued on March 6, 1962, assigned to the assignee of the present invention, there is disclosed and claimed a power tong construction of the type to which the present invention pertains. When the tong of the above referred to patent is employed, it is appreciated by those skilled in the art that the jaw segments which engage or grip the tubular member must be changed when the tong is used on different size pipe. Thus, the same tong may be used over a wide range of pipe diameters, thereby reducing capital investment. Also, since the same tong may be used on different diameter pipe merely by changing the jaw segment in the tong, the amount of time lost when switching from one pipe diameter size to another is decreased as compared with the amount of time lost when it is necessary to change from one tong size to another size in working with pipe of varying diameters.

The diameter of casing or tubular members ordinarily adapted to be engaged by a pipe tong of the type referred to in the above-identified patent varies from approximately four inches outside diameter up to approximately fourteen inches outside diameter. In any range of pipe diameter sizes, such as that just identified, the circumferential force exerted by the tong dies at the surface of the pipe increases as the diameter of the pipe decreases for any applied torque. Therefore, the gripping or engaging force of the dies must be increased as the pipe diameter decreases in order to maintain proper engagement of the dies with the pipe.

Additionally, in a tong of the type to which the present invention relates wherein the gripping force that grips the outside of the pipe or tubular member is developed through a gripping mechanism including a cam or inclined plane and roller, the mechanism must be physically positioned at a greater radial distance than the radius of the tubular member to be gripped in order that the tubular member can be received in the tong. Under theoretically ideal conditions, the distance from the longitudinal axis of the pipe to the point of die contact divided by the distance from the longitudinal axis of the pipe to the point of cam and roller contact is equal to one. However, the physical limitations of the tong, as above noted, prevent the attainment of the ideal condition immediately referred to.

Therefore, as the size of the pipe decreases, it can be appreciated that the distance between the longitudinal axis of the pipe and the point of die contact on the surface of the pipe decreases, whereas the distance from the longitudinal axis of the pipe to the point of contact of the cam and roller remains the same as for other size pipe. Ordinarily, the gripping force exerted on the pipe by the jaw segment in the tong remains the same regardless of pipe size for any given torque. Accordingly, for any given torque exerted or applied on the tong, there is a greater tendency as the pipee diameter decreases for the dies on the jaw segments to slip relative to the pipe or tubular member rather than grip and rotate the tubular member.

The present invention provides an arrangement whereby the position of the cooperating cam arrangement in the tong may be shifted radially so as to position it closer to the point of contact of the jaw segment die with the surface of the tubular member to thereby increase the radial force exerted on the die for any applied torque on the tong.

Another object of the present invention is to provide an improved tong arrangement whereby a greater force may be exerted by jaw segments in the tong to grip the pipe or tubular member and inhibit slipping between the jaw segments and the engaged pipe or tubular member.

Still another object of the present invention is to provide an improvement in a power tong which enables the same tong to be more effectively used over a wider range of pipe diameters.

Still a further object of the invention is to provide a power tong which may be used over a wider range of pipe diameters, the power tong being constructed and arranged to exert a greater radial force on smaller size pipe within the range of pipe sizes on which the tong may be used to inhibit slipping or disengagement of the tong with the pipe.

Figure 2:
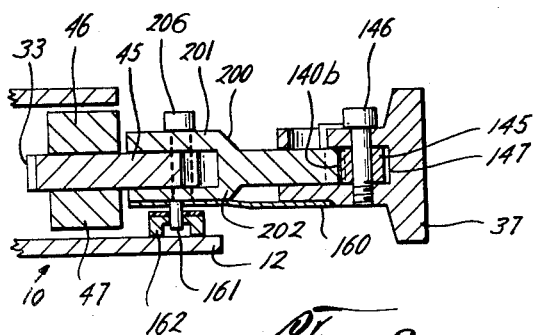

Other objects and advantages of the present invention will become readily apparent from a consideration of the following description and drawings wherein:

FIG. 1 illustrates in plan view a segmented rotary ring with jaw segments mounted thereon in accordance with the present invention; and FIG. 2 is a sectional view on the line 2—2 of FIG. 1 to illustrate in greater detail the arrangement of the present invention on a power tong.

The structural details of the tong to which the present invention is most readily adapted is described and shown in my copending application for "Tongs," bearing Serial No. 177,357, and filed in the U.S. Patent Office on March 5, 1962.

The rotary ring referred to generally in FIG. 1 by the numeral 32 is similar in construction to the rotary ring shown in the above referred to application for patent and supports the jaw segments 37, 38, and 39 thereon. The rotary ring 32 includes the main segment 41 with the segments 42 and 43 being pivotally connected to the main segment 41 by any suitable means such as the pivot pins 44 and 45'. Each of the rotary ring segments 41, 42, and 43 includes a central plate 45 with an upper plate 46 and a lower plate 47 secured thereto by any suitable means such as bolts or the like. It will be noted that the central plate 45 is substantially wider than the upper and lower plates 46 and 47 and that the upper and lower plates 46 and 47 are positioned adjacent or spaced from the outer periphery or edge 33 of the central plate 45. The rotary ring 32 is supported for rotation in a housing as shown in Patent No. 3,023,651 and my copending application above referred to.

The upper plate 46 on the main segment 41 and the lower plate 47 on the main segment 41 extend beyond the ends of the central plate 45 so as to overlap the central plate 45 of each of the segments 42 and 43 as can be seen in FIG. 1 of the drawings. Also, the central plate 45 of the segment 41 is illustrated as terminating at 50 in an arcuate recess, and the central plate 45 of each of the segments 42 and 43 terminates in the arcuate projection 50a which interfits the recess 50. It will also be noted that the central plate 45 of each of the segments 42 and 43 fits between the extended upper and lower portions 46 and 47 of the main segment 41 as illustrated in FIG. 1 of the drawings. The pivot pins 44 and 45' extend through the upper and lower plates 46 and 47 which are mounted on the main segment 41 of the rotary ring 32 and extend through the central plate 45 of each of the segments 42 and 43 whereby the segments 42 and 43 are pivotally mounted on the main rotary ring segment 41.

The above structural arrangement is described in greater detail in my above referred to copending application for patent and enables the rotary ring 32 to be quickly and easily opened when the tong is to be opened and thereafter closed about a tubular member, such as the tubular member represented by the numeral 19 in FIG. 1 of the drawings.

The jaw segments 38 and 39 are retained on the plate 45 of each of the rotary ring segments 42 and 43 by suitable means such as the arcuate window which is provided in each of the central plates 45 of each of the ring segments 42 and 43. The window is indicated in dotted line in FIG. 1 of the drawings and is represented by the numeral 80. A pin 81 extends through each of the jaw segments 38 and 39 and through each of the windows 80 in each of the central plates 45 to position the jaw segments 38 and 39 on their respective central plate 45. The window 80 is slightly larger in width than the diameter of the pin 81 to enable the transmission of the radial load from each of the jaw segments directly to the ring segment to prevent undue loading of the pin 81 when the jaw segments 37, 38, and 39 operatively engage a tubular member 19 to rotate it. This construction enables jaw segments of varying sizes to be positioned on the rotary ring segments 41, 42, and 43 whereby different sizes of pipe may be engaged by the tong.

For example, as illustrated in FIG. 1 of the drawings, a relatively small pipe such as a four inch outside diameter pipe is illustrated as being engaged in the tong arranged in accordance with the present invention. When it is desired to engage a larger diameter pipe in the tong, the jaw segments 37, 38, and 39 are removed from their respective positions on the rotary ring segments 41, 42, and 43 and jaw segments placed on the rotary ring segments so as to accommodate or grip a tubular pipe of the desired size. As illustrated in the drawings, rotary ring 32 is constructed so as to handle tubular pipe from say four inches O.D. up to approximately fourteen inches outside diameter.

In order to insure positive gripping action of the dies 150 of each of the jaw segments 37, 38, and 39 with small diameter tubular member 19, it is desirable to move the cooperating cam surface means closer to the face of the dies.

In order to accomplish this, the present invention provides a support plate 200 which is of general U-shaped configuration as shown in FIG. 2 of the drawings and includes the legs 201 and 202 which are adapted to be slidably received on the central plate 45 of the main rotary ring segment 41. Pins 205 and 206 may be positioned through openings in the support plates 200 and more particularly extended through the legs 201 and 202 as shown in FIG. 2 of the drawings so as to lock the support plate 200 on the central plate 45 of the main rotary ring segment 41.

The main jaw segment 37 is then adapted to be received on the projecting portion or surface 200a of support plate 200 which takes the place of plate 45, and a cooperating cam means as represented by the numeral 140a is formed between the support plate and the main jaw segment 37 which effects a more positive gripping action between the jaw segments 37, 38, and 39 and the smaller O.D. tubular member as illustrated at 19, due to the fact that a greater radial force is exerted for any given torque than would be exerted by cam arrangement 40.

The cam arrangement 140a for small diameter pipe replaces the cam 40 of FIG. 1 which is used for larger diameter pipe. The cam arrangement includes a central recessed portion 140b on the edge of the support plate 200. Additional recessed or tapered portions 140c are provided on each side of and are continuous with the central recessed portion 140b to provide a gradually sloping surface whereby the roller 145 mounted in the jaw segment may engage the tapered or sloping surfaces 140c upon relative movement between the jaw segment 37 and support plate 200 so as to move the jaw segment 37 radially to engage the tubular member 19. As shown in FIG. 2 of the drawings, the roller 145 is carried on pin 146 in the recess 147 of the jaw segment 37 and will engage the surfaces 140c upon relative movement between the jaw segment 37 and support plate 200 as will be described in greater detail hereinafter.

An arcuate window 90 is provided in the jaw segment 37, and holes 91 and 92 are provided in support plate 200. A pin 105 is provided for fitting in either the hole 91 or 92 to function as described in my copending application above referred to. A radially and rearwardly projection plate 160 is secured on the jaw segment 37 and slidably engages the leg 202 of the support plate 200 as shown in FIG. 2 of the drawings. Pins 161 depend downwardly therefrom and support an arcuate channel magnet 162 so that the channel may engage the housing wall 12 of the tong 10 in a manner as described and claimed in my copending application to drag the jaw segment 37 upon rotation of the rotary ring 32. This causes a more positive functioning of the invention.

Since the position of the cam surface arrangement 140a has been moved radially inwardly towards the dies 150 and towards the longitudinal axis of the tubular member 19 than would be the case if cam arrangement 40 were employed, a greater resulting force between the cam surfaces 140c and roller 145 is effected for any given amount of torque. It has been found that a greater roller force is necessary for smaller size pipe since the circumferential force applied through the dies 150 for any given torque on the tong increases as the pipe diameter decreases.

In a tong of the type to which the present invention relates wherein the tong is to be used over a wide range of pipe diameter sizes and wherein the gripping force that grips the outside of the tubular member is developed through a gripping mechanism including a cam or inclined plane and roller, the mechanism must be physically positioned at a greater radial distance than the radius of the largest tubular member within the range of pipe diameter sizes to be gripped in order that any tubular member within the range of pipe diameter sizes for which the tong is built can be received in the tong.

Also, in any range of pipe or tubular sizes, as the radius of the pipe decreases, the required force exerted by the dies on the tubular member increases for any given torque. As previously noted, the circumferential force exerted by the dies 150 on tubular member 19 for any given torque is greater for small diameter pipe than for large diameter pipe. Additionally, for any given torque, the circumferential force exerted on the roller by the cam or inclined plane increases as the cam is moved radially toward the longitudinal axis of the pipe. Thus, in the present invention for small pipe, the cam surface arrangement 140a is moved toward the surface of the dies 150 and is thereby placed nearer the longitudinal axis of the pipe to exert a greater circumferential force with greater resulting radial force being exerted on the jaw roller and on the dies 150 at any given torque on the tong.

The arrangement hereinabove described provides a satisfactory means whereby an auxiliary cam arrangement can be provided in a tong to thereby enable it to be used on a wider range of pipe diameter sizes and positively and satisfactorily grip not only the larger diameter pipe sizes, but also the smaller diameter pipe sizes.

In the operation of the invention, the support plate 200 is positioned on the central plate 45 of the rotary ring segment 41 by positioning the pins 205 and 206 through the holes in the central plate 45 and through the legs 201 and 202 of the support plate 200. This firmly secures the support plate 200 in position on the rotary ring segment 41, and then the main jaw segment 37 can be slipped on the support plate 200 and pin 105 then inserted in either hole 91 or 92 depending upon the direction of rotation of the rotary ring 32 as described in my above referred to copending application for patent.

In the present invention, the radial position of the auxiliary cam surface arrangement 140a provides a construction in which the force of the cam surfaces 140c on roller 145 when they are engaged more closely approximates the circumferential force exerted by the dies 150 on the pipe surface. Thus, shearing of the pipe surface by the dies and releasing of the dies 150 relative to the tubular member 19 is inhibited by the resulting increased radial force on the dies 150 at any given applied torque load.

What is claimed is:

1. In a rotary power tong for engaging a tubular member wherein a segmented rotary ring is provided with jaw segments on each segment of the ring and wherein at least one of the jaw segments and rotary ring segments includes a cam arrangement to move the jaw segment radially to contact the tubular member, the improvement comprising, an additional cam arrangement, means to support said additional cam arrangement radially towards the longitudinal axis of the tubular member prior to engagement of the jaw segment with said tubular member, said additional cam arrangement creating a greater resulting force between the jaw segment and tubular member when they are engaged for any amount of torque which may be applied to the tong, said support means including a support plate for fitting on one segment of said rotary ring, a projecting surface on said support means for receiving a jaw segment thereon, and said additional cam arrangement being formed on the edge of said surface and on said jaw segment whereby rotation of said rotary ring and support plate secured thereto feeds said jaw segment inwardly to grip the tubular member.

2. The invention recited in claim 1 including a magnetic means carried by said jaw segment and adapted to inhibit movement of said jaw segment thereby producing a more positive relative movement between said jaw segment and said rotary ring when said rotary ring is rotated to more positively engage said jaw segment and tubular member.

3. The invention recited in claim 1 wherein said additional cam arrangement includes a roller mounted on said jaw segment, and a recessed portion on said plate adjacent said roller whereby rotation of said rotary segment and plate thereon engages said roller and recessed portion and forces said jaw segment inwardly to grip the pipe.

4. The invention recited in claim 3 including means to actuate said additional cam arrangement in either direction of rotation of said rotary ring and plate and to release said jaws from the tubular member in either direction of rotation.

References Cited in the file of this patent
UNITED STATES PATENTS

| | | |
|---|---|---|
| 1,955,727 | Adams | Apr. 24, 1934 |
| 2,181,641 | Hicks | Nov. 28, 1939 |
| 2,720,126 | Bauer | Oct. 11, 1955 |
| 2,846,909 | Mason | Aug. 12, 1958 |
| 2,933,961 | Adams | Apr. 26, 1960 |
| 2,953,954 | Ochsner | Sept. 27, 1960 |
| 3,023,651 | Wallace | Mar. 6, 1962 |